BEAM ADDRESSABLE MEMORY SYSTEM

Filed Nov. 10, 1966 3 Sheets-Sheet 1

INVENTORS
C. DENIS MEE
RONALD E. MAC DONALD
OTTO VOEGELI
BY Gerald L Moore
ATTORNEY May 26, 1970 C. D. MEE ET AL 3,514,766

BEAM ADDRESSABLE MEMORY SYSTEM

Filed Nov. 10, 1966 3 Sheets-Sheet 3

United States Patent Office 3,514,766
Patented May 26, 1970

3,514,766

BEAM ADDRESSABLE MEMORY SYSTEM

Charles Denis Mee, Los Gatos, and Ronald E. MacDonald, San Jose, Calif., and Otto Voegeli, West Lafayette, Ind., assignors to International Business Machines Corporation, Armonk, N.Y., a corporation of New York Filed Nov. 10, 1966, Ser. No. 593,387
Int. Cl. G11c *11/14, 11/42*
U.S. Cl. 340—174 22 Claims

ABSTRACT OF THE DISCLOSURE

An information storage apparatus and a thin film of magnetic garnet material as the memory element are described. Information is recorded and readout of the memory element with the information storage apparatus using a high energy polarized light having a wavelength below 5,000 angstroms. The information storage apparatus and memory element have application as a high density, random access memory in data processing systems.

This invention relates to a beam addressable memory system of the type wherein data are recorded magnetically onto a memory element and are detected by scanning a high energy beam across the element for sensing the magneto-optical effects of the element on the beam.

One type of magnetic recording system employed is commonly referred to as thermomagnetic recording. In such thermomagnetic recording systems, the memory element is made of a magnetic material which responds to radiant energization thereby permitting use of such energy sources as laser beams for both recording and interrogation. The recording material has a magnetic switching field which is temperature dependent; such as is obtained, for instance, in magnetic garnets near their magnetic compensation temperature. When heated at selected sites as by directing a laser beam onto the surface thereof, the switching field of the recording material at that site is reduced below the amplitude of an applied magnetic biasing field and the material is selectively magnetized in the direction of the biased field. In this manner, a locally induced change of magnetization direction at the bit storage site is effected, which magnetization is retained when the heated spot cools.

The memory element is interrogated or read out nondestructively by passing a beam of polarized light, (i.e., a laser beam) through the bit storage site for a sufficiantly short period of time so as not to heat the storage medium sufficiently to change its magnetic state. The interrogating beam, after its passage through the storage medium whose state is being sensed, is sent through an optical analyzer for detection of a change, or lack of a change, in the polarization of the light detected, with any change being caused by the magneto-optical properties of the material at the site. In this manner, the local states of magnetization of the storage medium is detected magneto-optically, and readout of the information stored on the medium by the thermo-magnetic process is achieved.

Naturally, the speed at which such memory elements can be interrogated and the reliability with which the data can be read from the elements depends upon the magnitude of the magneto-optical properties of the memory element, and upon the ability of the interrogation system to detect these magneto-optical properties. Various ferrite and garnet materials previously have been tried for use as memory elements. However, as will be explained more fully later, the prior use of these materials has not proved completely successful.

For instance, certain garnets have been used as memory elements for thermomagnetic recording in the manner described in the U.S. Pat. 3,164,816 entitled, "Magneto-Optical Information Storage Unit and Apparatus," by J. T. H. Chang et al., as inventors and being issued on Jan. 5, 1965. In this patent, single crystals of garnet materials are used for recording purposes with the crystals being 0.001 inch (approximately 25 microns) thick. The atomic structure of such garnets is discussed in detail in this patent and is widely known. In general, magnetic garnets are described as having iron atoms populating in unequal numbers two types of crystalline sites. It is believed that the iron atoms on the octahedral sites are responsible for the magneto-optical effects which make them suitable for use as memory elements in the manner heretofore described.

However, while garnets as used in the past have served as suitable media for recording data thermomagnetically, certain shortcomings have been evidenced in their use. With the reading light source radiating a light beam in the yellow light range, or a wavelength range above 5000 A. (as described in the Chang patent referenced earlier) the magneto-optical effects imposed on the interrogating light beam were small and difficult to detect reliably.

In an effort to magnify the magneto-optical effects of the recording system, the recording mediums were made relatively thick. Thus, since the magneto-optical effects are proportional to the thickness of the material through which the interrogating beam is passed, the effects theoretically were magnified. However, the light absorption coefficients for garnets are sufficiently large to substantially reduce the amount of total light that was transmitted through the recording medium. Thus, further problems were encountered in reliably detecting any data recorded on the thicker mediums since the readout systems usually detect a change in the light intensity transmitted through the medium and, if the total light transmitted is slight, this change in light transmitted is even smaller.

Other efforts to increase the amount of light transmitted through the recording medium included using interrogating light beams having wavelengths well above 5000 Å. Since the light absorption coefficients for garnet materials generally decrease in value as the wavelength is increased from 5000 A., and increase rapidly as the wavelength is shortened below 5000 A., there resulted some increase in the amount of light transmitted through the recording medium thereby increasing the magnitude of the output signal obtainable in reading the recorded data. However, the reading of data from the thicker films in the increased wavelength intervals was still difficult.

As recording mediums employ thicker garnet films, additional problems are encountered in recording data onto the films. The recording of data is effected by magnetically aligning discrete areas of the film as explained before. The volume of the discrete area usually is heated to permit the magnetic alignment to occur. As thicker films are utilized, the volume that must be heated is increased thereby requiring more energy for heating. As a result, the recording process is slowed to permit sufficient heating of the memory element.

It is the general object of this invention to provide an improved beam addressable memory system which permits more rapid and reliable data recording and interrogation.

A further object of this invention is to provide an improved memory element on which data can be recorded by the thermomagnetic process at greater densities, and read at higher speeds and with greater reliability.

Still, a further object of this invention is to provide a memory system in which data can be stored at greater densities by the thermomagnetic process and can be detected more reliably at faster speeds.

According to the invention, improved interrogation and recording is achieved in a thermomagnetic recording system by utilizing a magnetic garnet thin film memory element in combination with a light beam in the near ultraviolet or shorter wavelength visible light spectrum both for recording and the reading of recorded data with the improved recording and readout of the data being based on the discovery that the magneto-optical properties of a magnetic garnet material are greatly magnified relative to the absorption properties thereof in the wavelength interval below 5000 A.

The objects, features and advantages of this invention will be apparent from the foregoing particular description of the preferred embodiments of the invention as illustrated in the accompanying drawings, in which.

Figure 1:
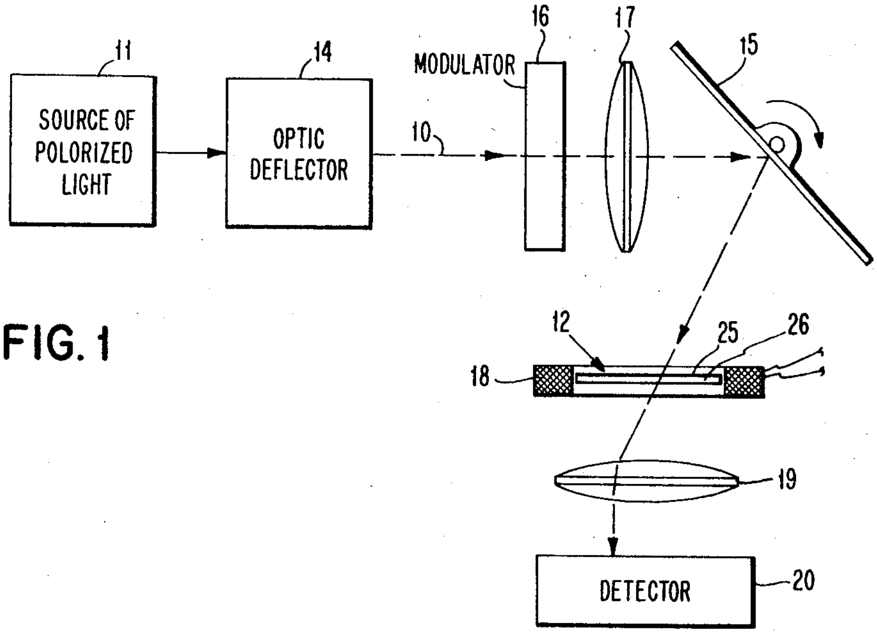
FIG. 1 is a side view, partially broken away, of a memory element used with the invention.

In FIG. 1, a typical thermomagnetic recording and readout system is illustrated schematically in which the invention can be applied. A high energy polarized light beam 10 is supplied by a radiant energy source such as a source of light or laser 11, which beam is used both for recording and interrogating a memory element 12 positioned to intersect the beam. This beam is scanned in several line positions across the memory element by the cooperative effects of a deflector 14 and a pivotable mirror 15. The data are recorded in modulating the beam by controlling a beam modulator 16 responsive to an input signal indicative of the data to be recorded while subjecting the memory element to a biasing magnetic field.

The data is usually in digital form representative of "1's" and "0's" and are recorded onto the memory element 12 by the thermomagnetic method. By this recording method, a material is used which will respond to radiant energization, such as that provided by the beam 10, and which has a high coercivity when it is near its magnetic compensation temperature, the latter preferably being at or near room temperature. Thus, when a discrete volume of the material is heated to a temperature near or above its compensation temperature under the influence of the beam 10, the coercive force of that volume is reduced sufficiently to permit an applied biasing field supplied by energization of a coil 18 to realign the magnetization of that portion of the material to the field direction. The new magnetization direction is retained after the material cools again and is indicative of the data recorded. The biasing field is supplied by energizing the coil 18. By aligning the magnetization of the material, previous to recording, in a predetermined direction different from that resulting from the magnetic field supplied by the coil 18 during recording, the selected sites of the memory element 12 which then are heated become magnetized in one direction and those areas not heated remain magnetized in a different direction by regulating the modulator 16 as the beam is scanned across the memory element.

The information is read out or detected by interrogating the memory element with passage of the radiant energy beam 10 through the site of each stored bit. For non-destructive readout, the beam 10 is scanned at a sufficiently fast rate through the bit storage sites to prevent heating of the storage medium above a predetermined minimum temperature which is sufficiently low to prevent the changing of the magnetic state of the medium. The state of the interrogating beam, after passage through a selected site on the storage medium, is sensed by the detector 20. In the preferred embodiment of the invention the detector 20 senses the change in the intensity of the light having specific polarities transmitted through the memory element, which change is due to the circular dichroism magneto-optical properties of the material of which the memory element is made.

As shown in FIG. 1, the detector 20 is positioned to detect the light transmitted through the memory element. Circularly polarized light, which may be produced by the well known assemblies of optical elements (not shown), is incident on the memory element and is absorbed by different amounts depending upon the direction of magnetization of the site through which the light is passing. Thus, the "1's" and "0's" can be detected by detecting the change in the intensity of the light passing through the individual sites, which intensity is responsive to the rate of absorption of the light within the medium at the respective sites.

The present invention is based on the discovery that the magneto-optical properties of garnet films are greatly magnified in the wavelength interval below 5000 A. at a rate far greater than the relative increase in the coefficient of absorption. Thus, the invention is embodied in a system using a recording and readout beam having a wavelength value below 5000 A., with the memory element having a thickness below 2 microns in thickness since it has been found that the magento-optical properties are sufficiently magnified to be easily detectable with a memory element of this thickness and the light absorption is reduced substantially by using the thin film of magnetic garnet material.

Figure 2:
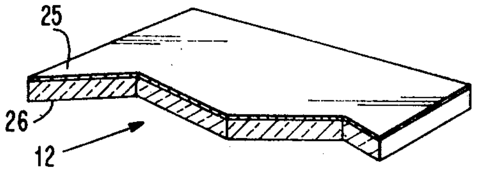
FIG. 2 is a perspective view, partially broken away, of a memory element used with the invention.

In the system, the memory element 12 (FIG. 2) is comprised of a thin film 25 of magnetic garnet material formed on a non-magnetic substrate 26. The substrate is non-magnetic so as not to interject any optical effects on the readout beam. The garnet thin film preferably has a thickness below 2 (two) microns, with the preferred embodiment to be described using 0.2 (two-tenths of a micron) micron thick. In cooperation with this memory element, light source 11 is selected to generate the beam 10 having a wavelength within the interval below 5000 A., at which wavelength the magneto-optical properties of the memory element are greatly magnified. The wavelength of the beam 10 is selected to make use of the optimum magneto properties of the garnet memory element and may vary with the type of garnet used. Some examples of light sources suitable for use in the system are the zinc oxide laser operating at a wavelength of 3770 A. and the gallium arsenide laser used in cooperation with a frequency doubler to obtain a beam wavelength of 4200 A.

With respect to the garnet memory element, the garnet preferably is selected from the class of the rare earth iron garnets including yttrium, lanthanum, praseodymium, neodymium, samarium, europium, gadolinium, terbium, dysprosium, holmium, erbium, thulium, ytterbium, and lutetium. A sufficient number of these iron garnet materials have been tested in the wavelength interval below 5000 A. to indicate that, in all probability, all exhibit greatly enhanced magneto-optical properties.

Figure 5:
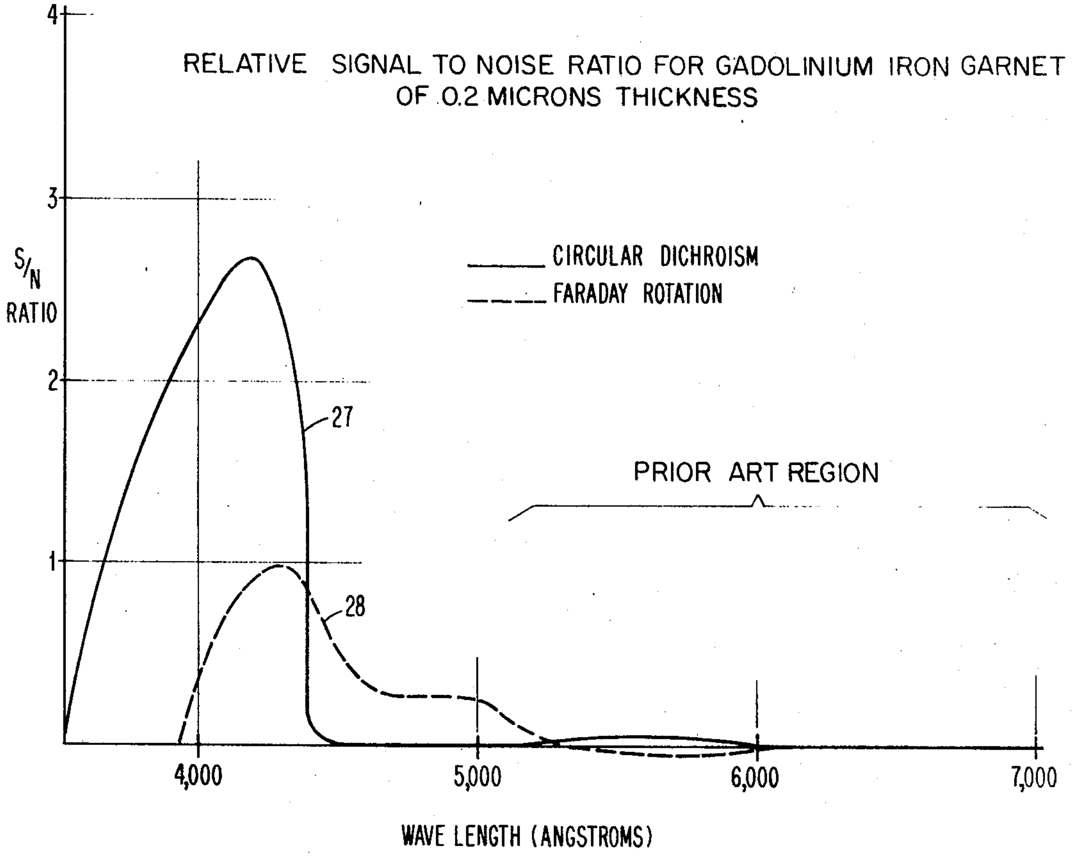
FIG. 5 is a graph showing the calculated signal-to-noise ratio of a gadolinium garnet thin film plotted against the wavelength of the interrogating beam.

FIG. 5 illustrates graphically the superior signals received in reading the data from the memory element 12 in accordance with the teachings of this invention. As shown, the calculated signal-to-noise ratio for a 0.2 micron thick film of gadolinium iron garnet when interrogated by a beam 10 having a wavelength of approximately 4200 A. is 2.5 on the graphic scale in comparison to that obtained in the wavelength interval above 5000 A.

of less than 0.1. This curve is derived by measuring the signal detected during readout of the magnetic garnet element and by assuming the noise ratio to be proportional to this output signal.

Figure 3:
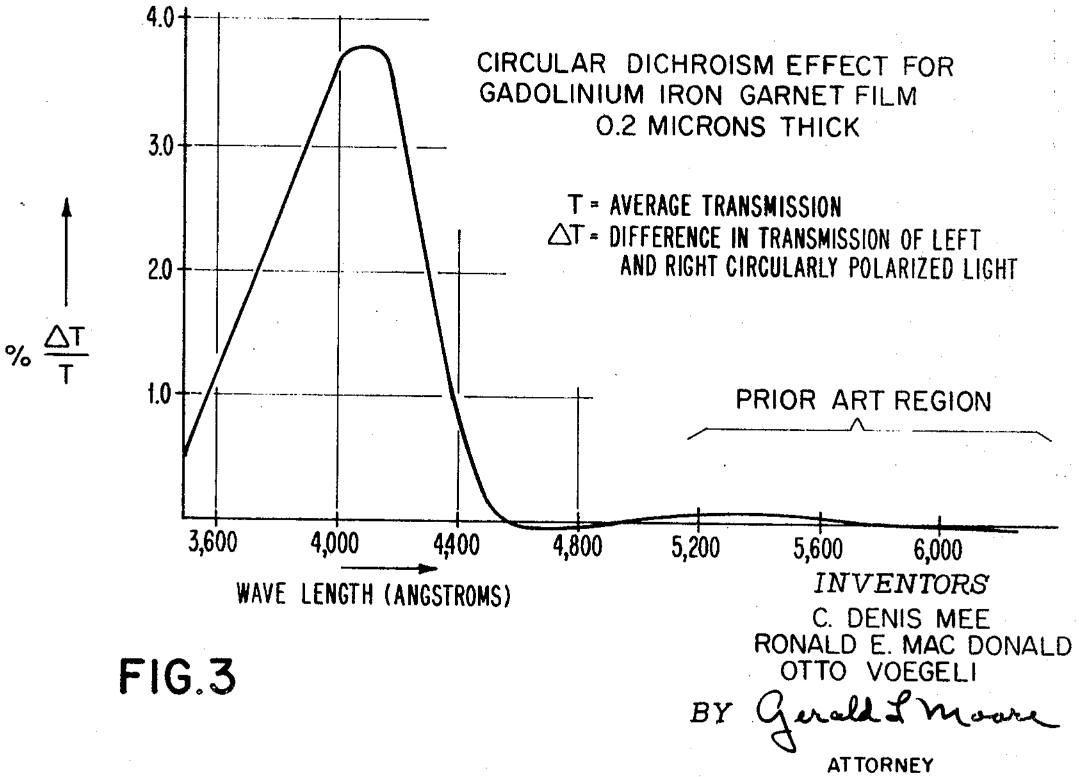
FIG. 3 is a graph showing the circular dichroism effects on light transmission of a gadolinium iron garnet thin film memory element plotted against the wavelength of the interrogating beam.

To explain the greatly enhanced signal-to-noise ratio, FIG. 3 shows the relationship of the change in light transmission to the total light transmitted through a memory element made of gadolinium iron garnets. In this curve, this change in transmitted light is due to the magneto-optical property of circular dichroism. The curve shows that at the wavelength of 4200 A. this change is greatly magnified in comparison to the previously used light range above 5000 A. Testing of other magnetic garnet materials in the same environment has indicated that all exhibit unusually magnified circular dichroism effects in this general wavelength range.

Figure 7:
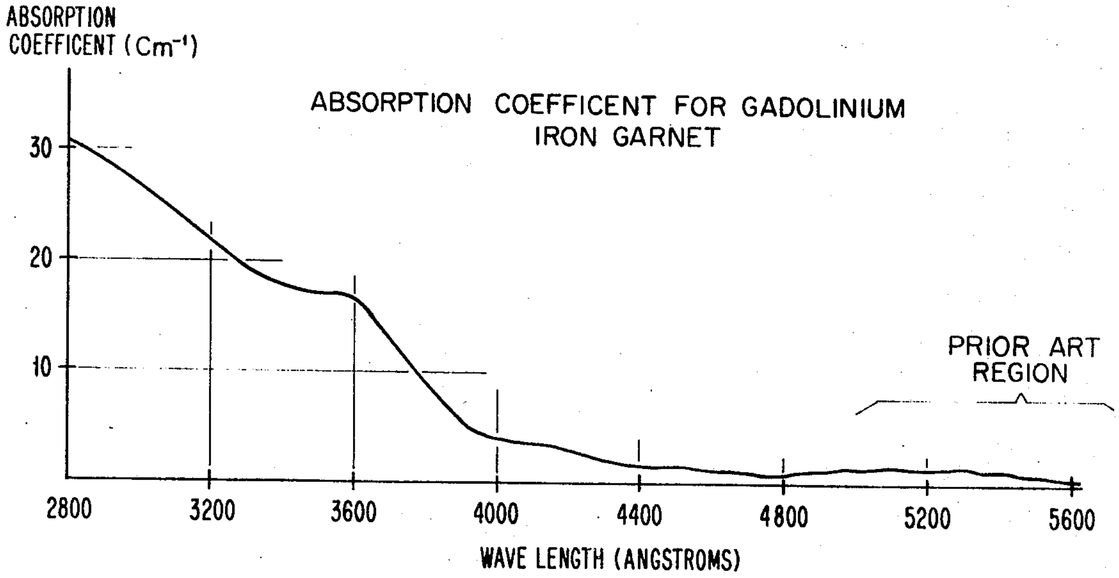
FIG. 7 is a graph showing the absorption coefficient for a gadolinium garnet thin film plotted against the wavelength of the interrogating beam.

By comparing FIG. 5 with the graph of FIG. 7 showing the variance of the absorption coefficient with the wavelength of the interrogating beam, it can be seen that while the total absorption of the tested garnet increases, the relative increase by percentage is not nearly so pronounced as the increase in the circular dichroism effects, thereby explaining the pronounced increase in the signal-to-noise ratio obtainable for this same wavelength interval. Since the magneto-optical properties are so magnified in the system described, far thinner films than heretofore used can be utilized to give excellent and high strength output signals.

Thus, to explain operation of one embodiment of the invention shown in FIG. 1, the source of polarized light 11 is selected to generate a polarized light beam in the near ultraviolet or lower wavelength interval in the visible light spectrum, i.e., below 5000 A. The beam 10 is scanned along various lines of the memory element 12, by being passed through the electro-optic deflector 14 and by being reflected off of a pivotable mirror 15 before striking the memory element 12. The deflector 14 serves to deflect the beam in a direction perpendicular to the plane of the drawing, into any of several line or track positions on the memory element. Each tracking position corresponds to a particular scanning line or track on the storage medium. For instance, if a data block on the storage medium 12 is composed of sixty-four tracks, the deflector 14 is constructed so that it can be set to deflect the beam to any one of sixty-four track positions. A deflector of this type is capable of positioning a light beam to any one of a thousand linearly-arranged positions at a deflection rate of at least $2\times10^5$ deflections per second. A fewer or greater number of tracks can be employed for each data block depending upon the manner in which it is desired to scan the beam across the memory element. Such an electro-optic deflector is shown and more fully described in the January 1964 issue of the IBM Journal of Research and Development, pages 64–67, in an article entitled, "A Fast Digital Indexed Light Deflector," by Kulcke et al.

After being selectively deflected by the deflector 14, the beam 10 is passed through a modulator 16 which serves to transmit or block the transfer of light in response to electrical signals indicating whether a "1" or a "0" is desired to be recorded. Such modulators or optical shutters are well known in the optical art. In this instance, when it is desired to write a "1," the light beam is transmitted from the source 11 to the storage medium 12 and the light modulator 16 is actuated with signals representative of a write instruction to allow for the modulator to pass the beam to a selected site on the memory element. Also when the modulator is actuated with a signal representative of a write "0" instruction, the beam is prevented from passing the modulator and from reaching the site on the storage medium 12. The lens 17 serves to properly align the beam with the mirror 15.

In this manner, digital data are stored with a site being magnetized in one direction indicating a "1" and sites being magnetized in a different direction indicating a "0." Naturally, the direction of the biasing field could also be reversed or the field shut off completely in response to the digital data to be recorded while scanning the radiant energy beam, to achieve the recording of "1's" and "0's" with equal results so far as the relative magnetic alignment of the individual memory element sites is concerned. A more complete description of this general type of recording system can be obtained by referring to the copending application No. 563,823 entitled, "Beam Addressable Memory System," filed July 8, 1966 with George J. Fan and C. Denis Mee as inventors and assigned to the same assignee as this patent application.

Figure 6:
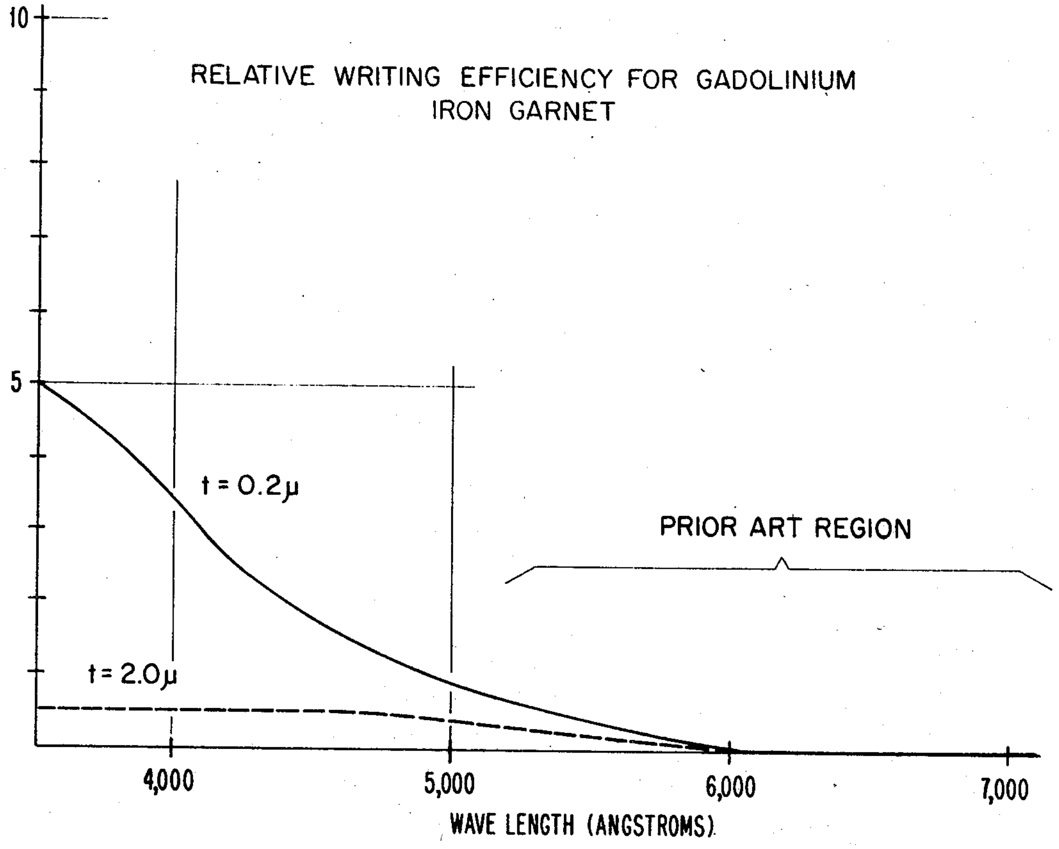
FIG. 6 shows the writing efficiency of a gadolinium garnet thin film plotted against the wavelength of the writing beam.

Since the wavelength of the beam 10 is in the wavelength interval below 5000 A., the absorption coefficient of the magnetic garnet is quite high as indicated in the graph of FIG. 7. With this greater absorption coefficient, a larger portion of the beam is absorbed in the recording material thereby making the heating thereof by use of the beam more efficient. Also since the garnet film is much thinner than that used in the past, a much smaller volume of the film must be heated to lower the coercivity of the material, thereby further enhancing the writing efficiency of the system. FIG. 6 shows graphically how the writing efficiency of this system changes with the wavelength of the recording beam and increases at the shorter wavelengths. The writing efficiency is proportional inversely to the radiant energy necessary to record properly onto a memory element. The graph also includes curves for film thickness of 0.2 micron and 2.0 microns to illustrate the greatly increased relative writing efficiencies obtained by using thinner recording films.

One process for making such thin film garnet memory elements is, in general, set forth in an article by W. L. Wade et al., entitled, "Chemically-Deposited Thin Ferrite Films" and published in the December 1965 issue of IEEE Transactions on Parts, Materials and Packaging. Films .02 micron thick can be obtained by carrying out one or more of the coating and firing procedures set out in that article. Films of more uniform thickness have been obtained by first forming a film as taught in the Wade reference and then spinning the film as taught in U.S. Pat. 3,198,657, issued Aug. 3, 1965 to P. D. Kimball and E. R. Blome.

The data are read from the memory element 12 with a system as shown in FIG. 1. In the preferred embodiment the magneto-optical property related to circular dichroism is detected. To detect the circular dichroism of the thin film garnet material, the beam 10 is circularly polarized in the well known manner and scanned along the recorded lines of data on the memory element. Since, as explained before, the digital data are recorded by the magnetic alignment of discrete areas of the garnet material in different directions, the intensity of the light being transmitted through the memory element will change in different polarization planes as the beam is scanned across discrete areas where "1's" and "0's" are recorded. Thus, an intensity detector 20 is used to sense the intensity of the light transmitted through the memory element thereby to generate a signal responsive to recorded data.

Shown in FIG. 3 is the circular dichroism effect, or change in light transmission for right and left circularly polarized light as the wavelength of the light is varied. A study of this graph reveals that the circular dichroism effects produced by the garnet material are greatly magnified in the below 5000 A. wavelength interval over that obtainable in the prior art above 5000 A. range. Thus, the change in intensity to be sensed for reading the data is many times that obtainable in prior art devices. FIG. 5 shows the relative signal-to-noise ratios obtainable in the below and above 5000 A. intervals. Those greatly magnified signals in the above 5000 A. range are due to the greatly enhanced magneto-optical properties of the garnet film memory element in that wavelength range.

Figure 4:
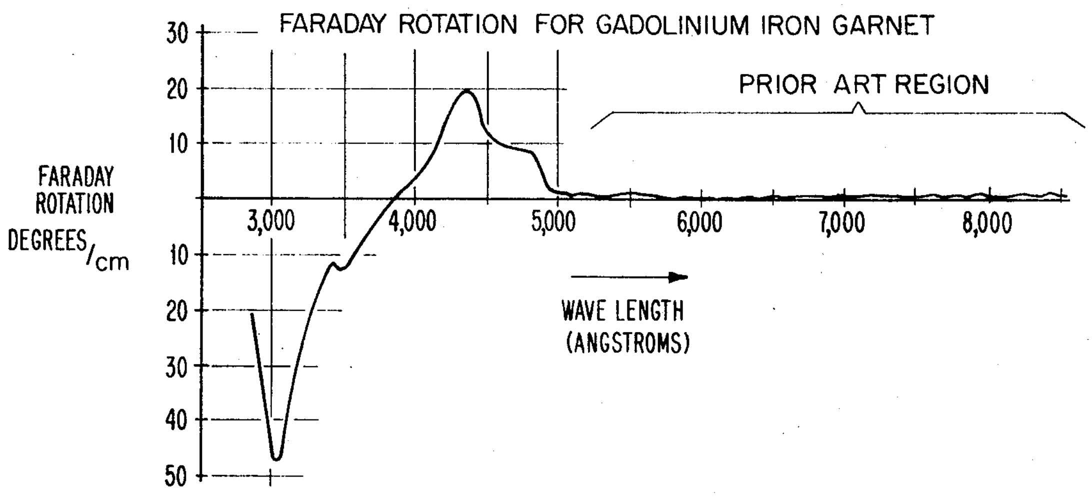
FIG. 4 shows graphically the Faraday effects of a thin film of gadolinium iron garnet plotted against the wavelength of the interrogating beam.

While the preferred embodiment of the invention utilizes the circular dichroism effect to sense the data stored on the memory element, the Faraday effect is also greatly magnified in the below 5000 A. wavelength interval and can also be used with success. As shown in FIG. 4, the Faraday rotation reaches values of approximately 20 thousand and 47 thousand degrees per centimeter thickness at the respective wavelengths of approximately 4300 A. and 3100 A. This compares with the Faraday rotation of below 3000 degrees per centimeter obtainable in prior art devices utilizing an interrogating beam having a wavelength of above 5000 A.

The signal-to-noise ratio for the Faraday rotation type readout system is also greatly magnified. In FIG. 5, the dotted line illustrates the signal-to-noise ratio calculated in the manner previously described from the measured signal. It is noted that the output signal is approximately 1.0 in the scale for the below 5000 A. range in comparison to a signal of less than 0.1 for previously used readout devices having wavelengths above 5000 A. The Faraday detector system is not shown since such detectors for sensing a rotation of the plane of polarization of polarized light are well known. Also, the writing scheme would be similar to that described in the first embodiment and would function with equally beneficial results.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. An information storage apparatus comprising the combination of:
- a memory element including a thin film of magnetic garnet material,
- means for directing a high energy polarized light beam having a wavelength in the near ultraviolet and short wavelength visible light spectrum onto said memory element, and
- means for detecting the magneto-optical effects produced on said light beam by the magnetized state of said memory element for generating an output signal responsive to the magnetization of said thin film.

2. An information storage apparatus as defined in claim 1 wherein
- said thin film of magnetic garnet material has a thickness of 2 microns or less.

3. An information storage apparatus as defined in claim 1 wherein
- said light beam has a wavelength below 5000 A.

4. An information storage apparatus as defined in claim 1 wherein
- said magnetic garnet material is one selected from the group including gadolinium, terbium and dysprosium.

5. An information storage apparatus as defined in claim 1 wherein
- said thin film is comprised of gadolinium iron garnet of approximately 0.2 micron thickness and said polarized light beam has a wavelength within the interval of 3000 A. to 4500 A.

6. An information storage apparatus as defined in claim 1 wherein
- the detecting means generates an output signal responsive to Faraday magneto-optical effects.

7. An information storage apparatus as defined in claim 1 wherein
- the detecting means generates an output signal responsive to the circular dichroism magneto-optical effects.

8. An information storage apparatus comprising the combination of:
- a memory element including a thin film of magnetic garnet material, when exposed to a biasing magnetic field while at a predetermined temperature at selected sites assumes a magnetized state which remains when the material is cooled below said temperature and said biasing field is removed,

- means for establishing a biasing magnetic field encompassing a portion of said element,
- means for directing a high energy light beam having a wavelength below 5000 A. onto selected sites of said memory element portion to heat said sites to a temperature above said pre-determined temperature, and
- means for selecting the sites to be magnetized in response to an input signal thereby to magnetize said memory element responsive to said signal.

9. An information storage apparatus as defined in claim 8 whereby
- said site selecting means modulates said light beam directing means responsive to said input signal.

10. An information storage apparatus as defined in claim 8 whereby
- said site selecting means modulates said biasing field establishing means responsive to said input signal.

11. An information storage apparatus as defined in claim 8 whereby
- said thin film of magnetic garnet material has a thickness of 2 microns or less.

12. An information storage apparatus as defined in claim 11 whereby
- said magnetic garnet material is one selected from the group including gadolinium, terbium or dysprosium iron garnets.

13. An information storage apparatus as defined in claim 12 whereby
- said light beam has a wavelength within the interval from 3000 A. to 4500 A.

14. An information storage apparatus comprising the combination of:
- a memory element including a thin film of magnetic garnet material which when exposed to a biasing field while at a predetermined temperature assumes a magnetized state which remains when the material is cooled below said temperature and said biasing field is removed,
- means for establishing a biasing magnetic field encompasing a portion of said element,
- means for directing a high energy polarized light beam having a wavelength below 5000 A. onto selected sites of said memory element portion to heat said sites to a temperature above said predetermined temperature,
- means for selectnig the sites to assume said magnetized state responsive to an input signal thereby to magnetize said element at sites responsive to said signal, and
- means to detect the magneto-optical effects produced on said polarized light beam by the magnetized state of the sites of said memory element thereby to reconstruct said input signal by scanning said beam across said memory element.

15. An information storage apparatus as defined in claim 14 wherein
- said thin film of garnet material has a thickness of less than 2 microns.

16. An information storage apparatus as defined in claim 15 wherein
- said thin film is comprised of a garnet selected from the group including gadolinium, terbium and dysprosium iron garnets.

17. An information storage apparatus as defined in claim 15 wherein
- said means for selecting the sites to assume a magnetized state modulates the energy of said polarized light beam directed onto said sites in response to said incoming signal.

18. An information storage apparatus as defined in claim 15 wherein
- said means for selecting the sites to assume a magnetized state modulates the means for establishing said biasing magnetic field to vary the strength of said field in response to said input signal.

19. An information storage apparatus as defined in claim 14 wherein said thin film of garnet material has a thickness of less than 2 microns and said light beam has a wavelength of between 3000 A. to 5000 A.

20. An information storage unit comprising a non-magnetic substrate, and a film of a magnetic garnet material having a thickness of less than 2 microns formed on one surface of said substrate, said garnet material presenting peak magneto-optical effects on a polarized light beam having a wavelength of less than 5000 A.

21. An information storage unit as defined in claim 20 wherein said thin film is comprised of a garnet material selected from the class of rare earth magnetic garnets.

22. An information storage unit as defined in claim 20 wherein said thin film is comprised of a garnet material selected from the class of garnets including gadolinium, terbium and dysprosium iron garnets.

References Cited

UNITED STATES PATENTS 3,164,816 1/1965 Chang et al. ________ 340—174

OTHER REFERENCES

Publication I.—"Optical Properties of Several Ferrimagnetic Garnets," by J. F. Dillon, Jr., Journal of Applied Physics, vol. 29, No. 3, March 1958, pp. 539–541.

JAMES W. MOFFITT, Primary Examiner

U.S. Cl. X.R.

250—219